April 24, 1934.  J. P. SPANG  1,955,982
MEAT CUBING MACHINE
Filed Oct. 9, 1931   3 Sheets-Sheet 3
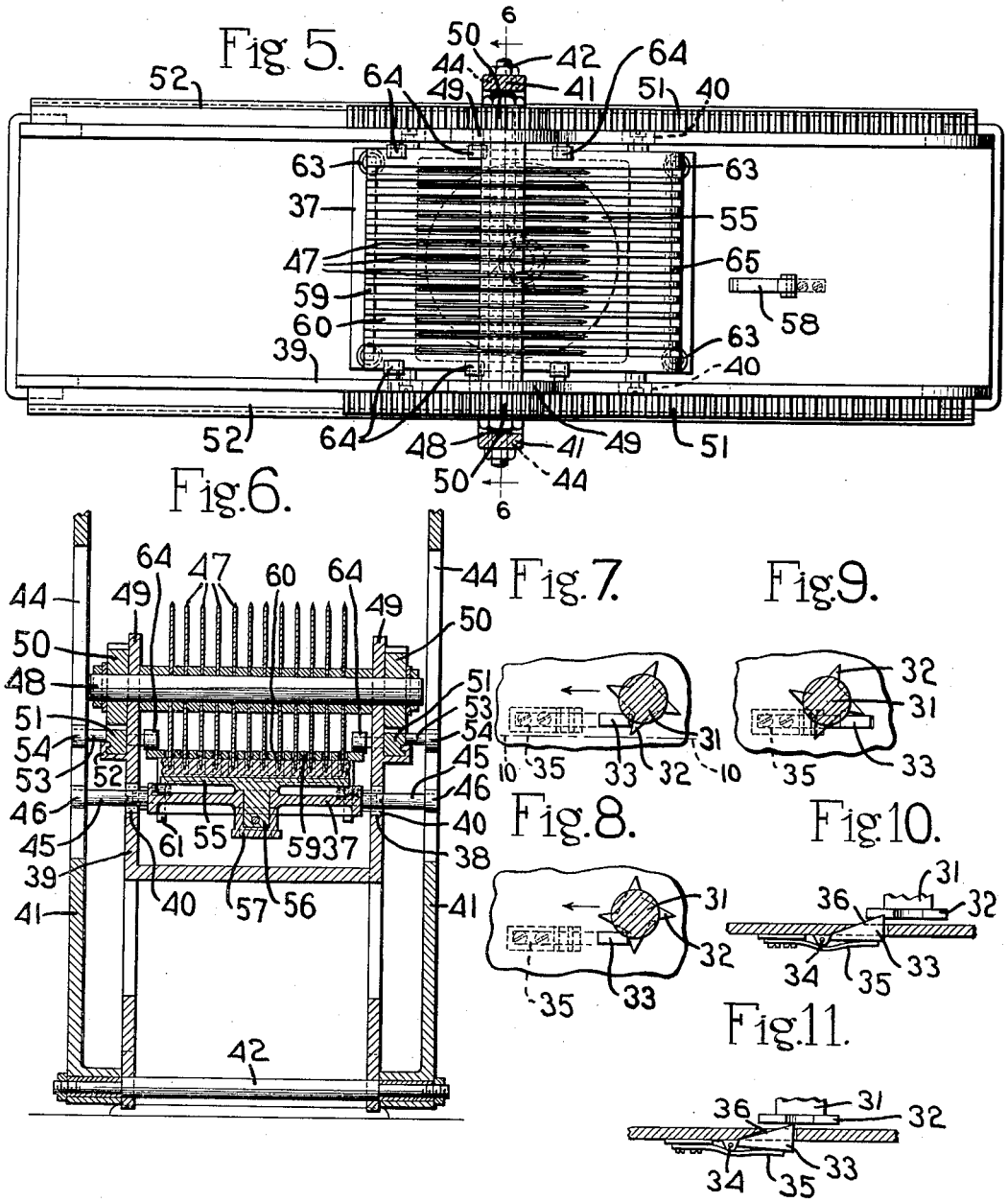
Inventor.
Joseph P. Spang
by Hand Smith Trunant
Attys Patented Apr. 24, 1934

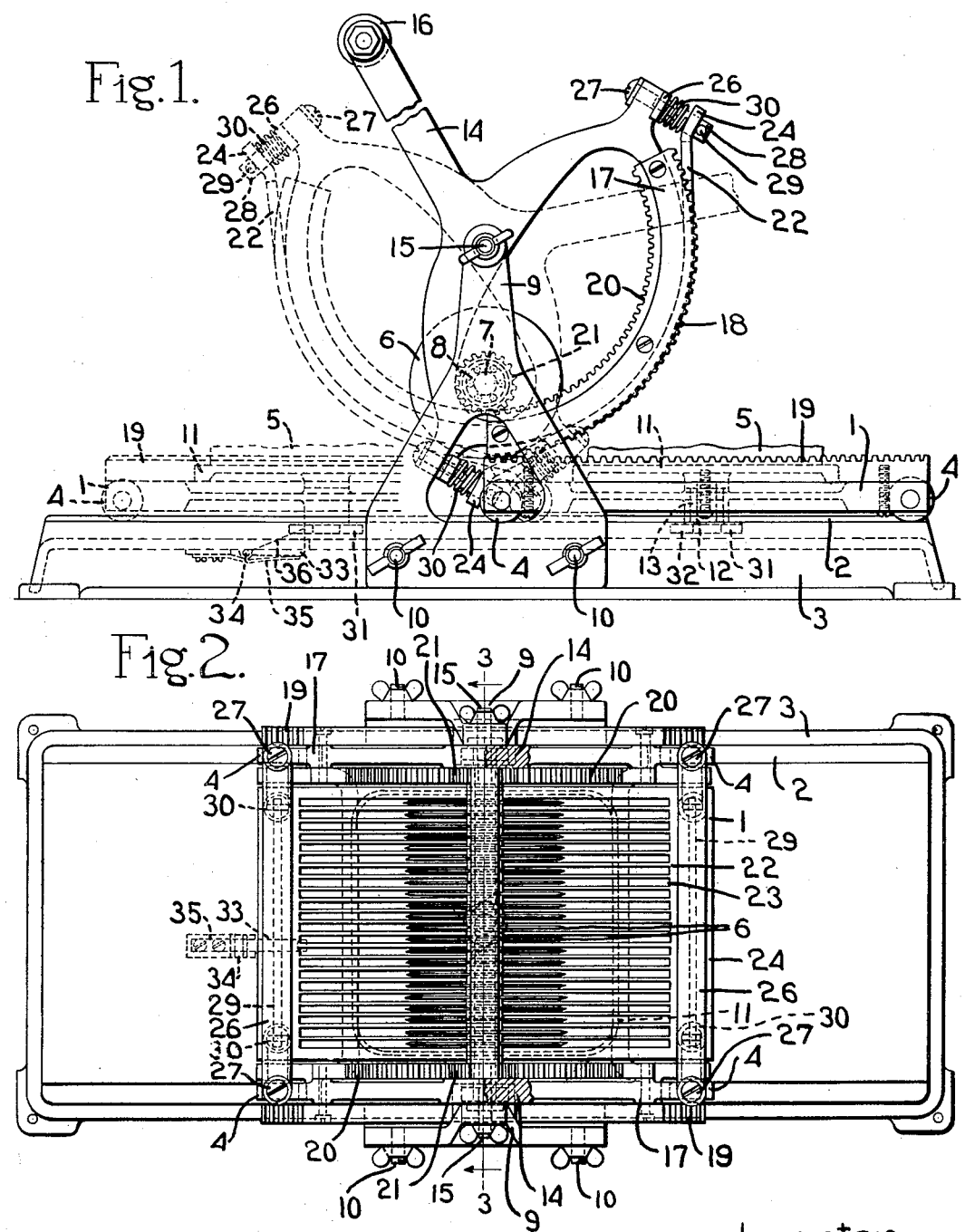

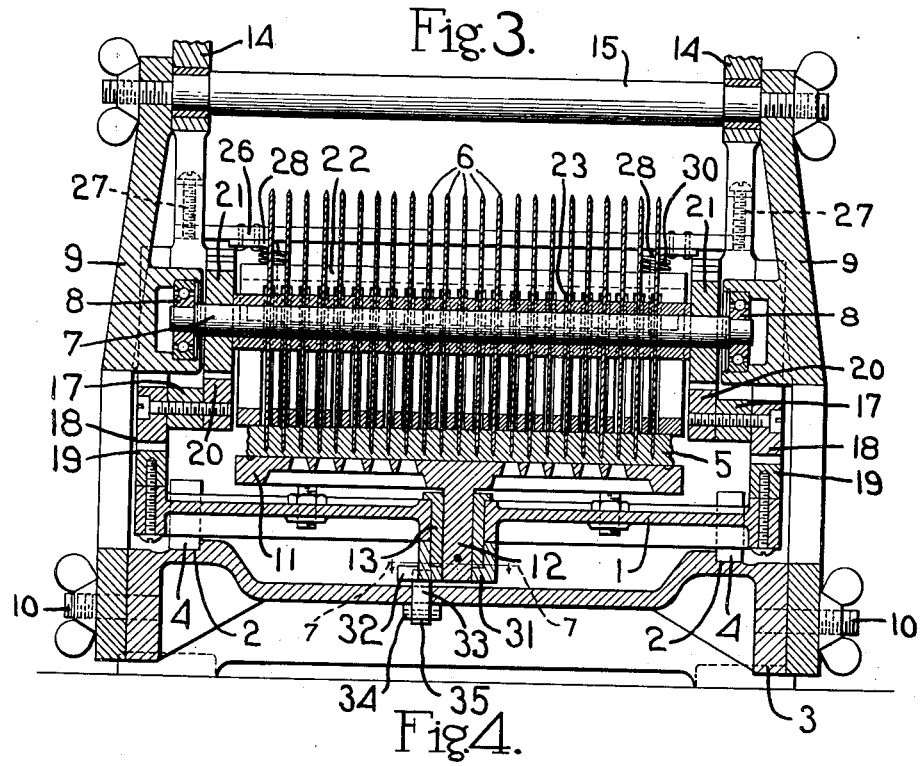

1,955,982

UNITED STATES PATENT OFFICE 1,955,982

MEAT-CUBING MACHINE

Joseph P. Spang, Quincy, Mass.

Application October 9, 1931, Serial No. 567,789

9 Claims. (Cl. 17—27)

This invention relates to meat-cubing machines of the general type in which the slice of meat to be cubed is mounted on a reciprocating meat-supporting carriage which is adapted to pass beneath a gang of slitting knives rotatable about a fixed axis.

One object of the invention is to provide a novel means for actuating the carriage and the knives, such means comprising an oscillating lever with such connections between the lever and the knives that on the forward stroke of the lever the carriage is moved beneath the knives in one direction and the knives are given their necessary rotative movement while during the return stroke of the lever the carriage is returned to its initial position and the knives are also given their necessary rotative movement.

The device also includes a turntable on which the meat is mounted and means for automatically turning the table at the end of the forward stroke so that upon the return stroke the slits will be cut in the meat at right angles to those which were cut during the forward stroke.

With this improvement, therefore, a single forward and return stroke of the lever results in cubing a slice of meat.

In order to give an understanding of the invention I have illustrated in the drawings some selected embodiments thereof which will now be described after which the novel features will be pointed out in the appended claims.

Fig. 1 is a side view of a meat-cubing machine embodying my invention;

Fig. 2 is a top plan view thereof;

Fig. 3 is a section on the line 3—3, Fig. 2;

Fig. 4 is a side view of a different embodiment of the invention;

Fig. 5 is a top plan view of Fig. 4;

Fig. 6 is a section on the line 6—6, Fig. 5;

Figs. 7, 8 and 9 are sections on the line 7—7, Fig. 3 showing the operation of the means for rotating the turntable;

Figs. 10 and 11 are sections on the line 10—10, Fig. 7 also showing the operation of the means for turning the turntable;

In the machine herein shown the slice of meat to be cubed is mounted on a reciprocating carriage and the slitting of the meat is accomplished by a gang of rotary slitting knives which rotate about a fixed axis. Referring first to Fig. 1 the reciprocating meat-supporting carriage is indicated 1 and it is mounted to reciprocate on ways 2 formed in a supporting frame 3. The carriage is shown as provided with rollers 4 which run on the ways or track 2. The slice of meat to be cubed is indicated at 5.

The slitting knives by which the slits are made in the meat are indicated at 6. These are rotary knives, there being a plurality of such knives fixedly mounted on a shaft 7 which is journalled in bearings 8 carried by the uprights 9 at each side of the frame 3. As herein shown these uprights are made separately from the frame 3 but are secured to the sides thereof by means of suitable bolts 10.

The meat-supporting carriage 1 is provided with a turntable 11 on which the slice of meat 5 is directly supported, the purpose of the turntable being to provide means for turning the meat after the carriage 1 has made one pass under the knives and one series of parallel slits have been cut in the meat so that on the return pass a second series of slits will be cut at right angles to the first series as usual in meat-cubing machines. The turntable 11 is shown as having a pivotal stem 12 depending therefrom which is rotatably mounted in a suitable bearing 13 carried by the carriage 1.

One feature of the present invention relates to a novel means of reciprocating the carriage 1 and rotating the knives 6. For this purpose there is provided a single oscillatory actuating lever which is arranged so that during the forward stroke of the lever the carriage will be given the first pass beneath the knives to cut the first series of slits therein while during the return stroke of the lever the meat will be given the second pass beneath the knives to cut the second series of slits therein. In the construction shown in Figs. 1, 2 and 3 the actuating member comprises two lever arms 14 which are mounted on a rod 15 carried in the upper end of the uprights 9, said lever arms being connected at their upper ends by means of a handle portion 16. The lower end of each lever arm is provided with a curved double rack portion 17 which is formed on the arc of a circle struck from the center 15. Each double rack portion 17 has on its outer face a series of rack teeth 18 adapted to mesh with gear teeth 19 formed in the upper face of the carriage 1. The inner edge of each double rack member 17 is provided with rack teeth 20 adapted to mesh with a pinion 21 fast on the knife shaft 7.

Hence when the double rack bars are swung from the full to the dotted line position Fig. 1 such movement operates to shift the carriage from the full to the dotted line position in said Fig. 1 thereby carrying the meat 5 beneath the knives 6, and at the same time the engagement of the rack teeth 20 with the gear 21 rotates the knives rapidly to cause them to cut the slits in the meat.

As usual in meat-cubing machines the knives and the turntables are so disposed relative to each other that the edge of the knives is located slightly above the lower edge of the turntable so that the meat will not be cut entirely through but there will remain a thin film of meat on the bottom face of the slice which will remain uncut.

There is also provided a yielding hold-down member adapted to engage the top of the meat and hold it firmly against the turntable during the meat-slitting operation, said hold-down releasing the meat at the end of each stroke. The hold-down shown in Figs. 1 to 3 comprises an arcuate plate 22 provided with slots 23 in which the knives operate. This hold-down member extends substantially the full length of the rack bar 17 and the ends 24 of the plate are bent backwardly or outwardly from the arcuate line of curvature of the body of the hold-down member.

For attaching the hold-down 22 to the lever arms 14 there are provided two cross bars 26 extending from one lever arm to the other and secured thereto by suitable screws 27. Each cross bar is formed with a depending finger 28 which passes through an aperture in the backwardly-bent edge 24 of the hold-down member, each finger having a pin 29 extending transversely therethrough to retain the hold-down member on the fingers. 30 indicates a spring surrounding each finger 28 and situated between the hold-down member and the cross bar 26. These springs 30 thus provide a yielding backing for the hold-down member which permits the latter to yield to accommodate slices of meat of different thicknesses.

In using the meat-cubing machine the carriage 1 will be moved into its forward position by swinging the lever arms 14 into the full line position Fig. 1 with the handle 16 at the back end of the stroke. The slice of meat 5 to be cubed is then placed on the turntable 11 and the operator grasps the handle 16 and swings the lever arms 14 forwardly to the forward limit of their movement. During this forward stroke the carriage 1 with the table thereon is moved backwardly into the dotted line position thus carrying the meat beneath the knives, and at the same time the knives are rotated rapidly to cut the slits in the meat. When the carriage 1 approaches the end of its stroke the turntable will be automatically turned through 90° and as soon as the forward stroke of the lever arm 14 has been completed as shown by dotted lines Fig. 1 the operator immediately swings the lever arms backwardly into their full line position thereby giving the carriage 1 its return stroke which will result in cutting a second series of slits in the meat at right angles to the first series.

The turning of the turntable is accomplished by the following mechanism.

The pivot shaft 12 of the turntable has fast thereon a four-point star wheel 31 which is formed with four teeth 32. The frame 3 is provided with a spring-pressed pawl 33 which is pivotally mounted at 34 and is acted on by a suitable spring 35. This pawl is so situated that as the carriage approaches its rearward position the pawl will engage one of the teeth 32 of the star wheel so that during the final movement of the carriage the turntable will be rotated through a quarter revolution. This is illustrated best in Figs. 7 to 11. Fig. 7 illustrates the pawl just as it comes into engagement with one of the teeth 32, it being understood that the carriage and the star wheel are moving toward the left in said figure. As the carriage continues to move the engagement of the finger 32 with the stationary pawl 33 rotates the star wheel through the position shown in Fig. 8 into the position shown in Fig. 9 thereby turning the turntable through 90°. The pawl is formed with the inclined cam face 36 so that upon the return stroke the star wheel merely wipes over the pawl, depressing the latter as shown in Fig. 11 but without causing any rotative movement of the turntable.

In Figs. 4 to 6, I have shown a slightly different embodiment of the invention which, however, operates on the same general principle. In this embodiment the reciprocating carriage on which the meat is supported is indicated at 37 and this carriage operates in ways 38 in the supporting frame 39. The ways 38 are shown as slots in the sides of the frame as the carriage is provided with rolls 40 which operate in the slots. The carriage is given its reciprocation by means of two lever arms 41 pivotally mounted on a rod 42 supported in the base of the frame 39. These two lever arms 41 are connected at their upper end by a handle portion 43 and they and the handle form a sort of bail-shaped structure which straddles and embraces the frame 39.

Each lever arm 41 is provided with a slot 44 and the carriage 37 is formed at each end with a projection 45 carrying a roll 46 operating in the slot 44.

The knives are indicated at 47 and are in the form of rotary disk knives fixedly mounted on a knife shaft 48 which is rotatively mounted in extension 49 formed on the sides of the frame. The knife shaft 48 is provided with a pinion 50 at each end and these pinions mesh with rack bars 51 which are slidably mounted in ways 52 formed in the sides of the frame 39. Each rack bar is provided with an extension or projection 53 which carries a roll 54 operating in the slot 44 of the corresponding lever arm 41.

Assuming the parts are in the position shown in full lines Fig. 4 it will be seen that a movement of the lever arms 44 from the full to the dotted line position Fig. 4 will operate to shift the carriage 37 longitudinally of the ways 38, thereby moving the carriage beneath the knives 47. The same movement of the lever arms 40 will operate through the projections 53 to shift the rack bars 51 thereby rotating the knives 47 so that during the forward stroke of the lever arms 41 the meat-supporting carriage will be given one pass beneath the knives and the knives will be rotating. Similarly, during the return stroke of the lever arms the carriage will make a second pass beneath the knives and the knives will also be rotated but in the opposite direction.

As in the other embodiment of the invention the carriage 37 has a turntable mounted thereon on which the slice of meat 5 is directly supported. This turntable is indicated at 55 and it is provided with a stem 56 which depends through the carriage 37 and is rotatively mounted thereon. The lower end of the stem carries the star wheel 57 similar to the starwheel 31 and which co-operates with a spring-pressed pawl 58 similar to the pawl 33 thereby to give the turntable a quarter turn at the end of the forward stroke.

In the construction shown in Figs. 4, 5 and 6 the hold-down for holding the meat in position on the turntable during the meat-slitting operation comprises a hold-down plate 59 provided with slits 60 in which the knives 47 operate. This hold-down plate is provided at each corner with a depending finger 61 which extends through the table 37, each finger carrying a pin 62 to prevent withdrawal of the finger from the carriage. 63 indicate springs surrounding the fingers and forming a yielding backing for the hold-down plate 59.

The springs act normally to raise the hold-down at each end of the stroke of the carriage so that the slice of meat 5 is free to be removed from the turntable or a fresh slice is free to be placed on the turntable. During the meat-slitting operation, however, these hold-down members are forced into clamping engagement with the slice 5 of meat. This is accomplished by means of hold-down rolls 64 which are carried by the frame and under which the edges of the hold-down plate 59 pass during the movement of the carriage from the full to the dotted line position and vice versa.

The ends of the hold-down plates are curved as shown at 65 so that when these curved ends strike the rolls 64 there will be a camming action which depresses the hold-down into engagement with the meat. The rolls 64 are so located that at each end of the stroke the hold-down is disengaged from the rolls and is, therefore, free to be elevated out of engagement with the meat by the springs 63.

I claim.

1. In a meat-cubing machine, the combination with a supporting frame, of a meat-supporting carriage mounted for reciprocation thereon, an oscillating operating member pivoted to said frame, a gang of rotary slitting knives mounted in said frame to rotate about a fixed axis, an arcuate rack member carried by the operating member and provided with two sets of rack teeth, a gear rigid with the knives meshing with one set of rack teeth and teeth on the carriage meshing with the other set of rack teeth, whereby the oscillating movement of the operating member moves the carriage beneath the knives and also rotates said knives.

2. In a meat-cubing machine, the combination with a supporting frame, of a meat-supporting carriage mounted for reciprocation thereon, an oscillating operating member pivoted to said frame, a gang of rotary slitting knives mounted in said frame to rotate about a fixed axis, an arcuate rack member carried by the operating member and provided with two sets of rack teeth, a gear rigid with the knives meshing with one set of rack teeth and teeth on the carriage meshing with the other set of rack teeth, whereby the oscillating movement of the operating member moves the carriage beneath the knives and also rotates said knives, and a yieldingly-mounted arcuate-shaped hold-down carried by the operating member and having rolling contact with the slice of meat as it is carried beneath the knives.

3. In a meat-cubing machine, the combination with a frame having guideways, of a meat-supporting carriage mounted for reciprocation in said guideways, a gang of rotary slitting knives journalled in the frame above the path of the carriage to rotate about a fixed axis, a bail-shaped operating member pivoted to the frame beneath the knives, the arms of said member being slotted, projections extending from the carriage into said slots, a rack bar slidably mounted on the frame, a gear rigid with but of less diameter than the knives and meshing with said rack bar, and connections between said rack bar and operating lever, whereby swinging movement of the operating lever carries the carriage beneath the knives and rotates the knives.

4. In a meat-cubing machine, the combination with a reciprocating meat-supporting carriage, of a gang of rotary slitting knives rotatable about a fixed axis, an oscillating operating member oscillatable about a different axis from that of the knives, means connecting said member to both the carriage and the knives by which during the forward stroke of said operating member the table is moved in one direction beneath the knives and during the return stroke of said member the table is moved in the opposite direction and the knives are rotated during both strokes, and a combined hold-down and stripper member carried by the operating member and having engagement with the portion of the meat on which the knives are operating.

5. In a meat-cubing machine, the combination with a reciprocating meat-supporting carriage, of a gang of rotary slitting knives rotatable about a fixed axis, an oscillating operating member oscillatable about a different axis from that of the knives, means connecting said member to both the carriage and the knives by which during the forward stroke of said operating member the table is moved in one direction beneath the knives and during the return stroke of said member the table is moved in the opposite direction and the knives are rotated during both strokes, and an arcuate hold-down member carried by the operating member having engagement with the portion of the meat on which the knives are operating.

6. In a meat-cubing machine, the combination with a reciprocating meat-supporting carriage, of a gang of rotary slitting knives rotatable about a fixed axis, an oscillating operating member oscillatable about a different axis from that of the knives, means connecting said member to both the carriage and the knives by which during the forward stroke of said operating member the table is moved in one direction beneath the knives and during the return stroke of said member the table is moved in the opposite direction and the knives are rotated during both strokes, and a hold-down member yieldingly carried by the operating member and engaging the portion of the meat on which the knives are operating.

7. In a meat-cubing machine, the combination with a frame, of a reciprocating meat-supporting carriage slidably mounted thereon, a gang of rotary slitting knives mounted in said frame and rotatable about a fixed axis, an oscillating operating member pivoted to the frame to turn about a different axis from that of the knives and swingable about said axis from a rearward position to a forward position and vice versa, a connection between said operating member and said carriage by which the carriage is moved from one side to the other of the knives by the swinging movement of the operating member between its rearward position and its forward position, a gear rigid with but of smaller diameter than the knives, a rack bar meshing with said gear and connected to said oscillating operating member, said rack bar having sufficient length so that it is in constant engagement with said gear in all positions of the operating member.

8. In a meat-cubing machine, the combination with a frame, of a reciprocating carriage slidably mounted thereon, a meat-supporting turntable mounted on the carriage, a gang of rotary slitting knives mounted in said frame and rotatable about a fixed axis, an oscillating operating member pivoted to the frame to turn about a different axis from that of the knives and swingable about said axis from a rearward position to a forward position and vice versa, a connection between said operating member and said carriage by which the carriage is moved from one side to the other of the knives by the swinging movement of the operating member between its rearward position and its forward position, a gear rigid with but of smaller diameter than the knives, a rack bar meshing with said gear and connected to said oscillating operating member, said rack bar having sufficient length so that it is in constant engagement with said gear in all positions of the operating member, and means to turn the table on the carriage when the latter reaches one end of its reciprocatory movement.

9. In a meat-cubing machine, the combination with a frame, of a reciprocating meat-supporting carriage slidably mounted thereon, a gang of rotary slitting knives mounted in said frame and rotatable about a fixed axis, an oscillating operating member pivoted to the frame to turn about a different axis from that of the knives and swingable about said axis from a rearward position to a forward position and vice versa, a connection between said operating member and said carriage by which the carriage is moved from one side to the other of the knives by the swinging movement of the operating member between its rearward position and its forward position, a gear rigid with but of smaller diameter than the knives, a rack bar meshing with said gear and connected to said oscillating member, said rack bar having sufficient length so that it is in constant engagement with said gear in all positions of the operating member, means to turn the table on the carriage when the latter reaches one end of its reciprocatory movement, and a hold-down member for engaging the meat while it is being acted on by the knives.

JOSEPH P. SPANG.